(12) United States Patent
Shinozuka

(10) Patent No.: US 11,836,405 B2
(45) Date of Patent: Dec. 5, 2023

(54) INFORMATION PROCESSING METHOD REGISTERING FIRST PRINT QUEUE TO BE USED AT TIME OF PRINTING AND SECOND PRINT QUEUE TO BE USED AT TIME OF PRINTING

(71) Applicant: CANON KABUSHIKI KAISHA, Tokyo (JP)

(72) Inventor: Naoki Shinozuka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/719,582

(22) Filed: Apr. 13, 2022

(65) Prior Publication Data

US 2022/0334781 A1 Oct. 20, 2022

(30) Foreign Application Priority Data

Apr. 20, 2021 (JP) .................................. 2021-071331

(51) Int. Cl.
*G06F 3/12* (2006.01)

(52) U.S. Cl.
CPC .......... *G06F 3/1236* (2013.01); *G06F 3/1204* (2013.01); *G06F 3/126* (2013.01); *G06F 3/1286* (2013.01); *G06F 3/1292* (2013.01)

(58) Field of Classification Search
CPC ...... G06F 3/1236; G06F 3/1204; G06F 3/126; G06F 3/1286; G06F 3/1292

USPC ........................................................ 358/1.15
See application file for complete search history.

(56) References Cited

U.S. PATENT DOCUMENTS

| | | | |
|---|---|---|---|
| 8,767,226 B2 | 7/2014 | Sakura | |
| 2017/0006166 A1* | 1/2017 | Sumiuchi | H04M 1/72412 |
| 2020/0045763 A1* | 2/2020 | Watanabe | H04W 76/16 |
| 2021/0306944 A1* | 9/2021 | Nishida | G06F 3/1236 |
| 2021/0306947 A1* | 9/2021 | Koizumi | G06F 1/3284 |

FOREIGN PATENT DOCUMENTS

| | | |
|---|---|---|
| JP | 2002-366502 A | 12/2002 |
| JP | 2012-173816 A | 9/2012 |

* cited by examiner

*Primary Examiner* — Allen H Nguyen
(74) *Attorney, Agent, or Firm* — VENABLE LLP

(57) ABSTRACT

A control method for an information processing apparatus that communicates with an image output apparatus includes receiving a certain user operation, and executing as processing based on the certain user operation, both of registering a first print queue to be used at the time of printing using a first wireless connection via an external access point between the information processing apparatus and the image output apparatus, and registering a second print queue to be used at the time of printing using a second wireless connection not via the external access point between the information processing apparatus and the image output apparatus.

15 Claims, 7 Drawing Sheets

FIG. 4A

| WIRELESS LAN ROUTER SETTING SCREEN | |
|---|---|
| WIRELESS LAN NAME (SSID) | SSID_XXXX — 401 |
| ENCRYPTION METHOD | WEP ▼ — 402 |
| | [CANCEL] [SET] — 403 |

WIRELESS LAN ROUTER SETTING SCREEN

PLEASE INPUT PASSPHRASE OF WIRELESS LAN ROUTER.

[                                    ] — 405

[CANCEL] [SET] — 406

WIRELESS LAN CONNECTION METHOD OF IMAGE OUTPUT APPARATUS

501 ● CONNECT BY WIRELESS INFRASTRUCTURE CONNECTION

502 ○ CONNECT BY WIRELESS DIRECT CONNECTION

[CANCEL] [OK] — 503

INFORMATION PROCESSING METHOD REGISTERING FIRST PRINT QUEUE TO BE USED AT TIME OF PRINTING AND SECOND PRINT QUEUE TO BE USED AT TIME OF PRINTING

BACKGROUND OF THE INVENTION

Field of the Invention

The present invention relates to an information processing method of performing a setup of an image output apparatus, an information processing apparatus, and a non-transitory computer-readable storage medium.

Description of the Related Art

When outputting an image from an information processing apparatus via a wireless local area network (to be referred to as a wireless LAN hereinafter) using an image output apparatus, it is necessary to make a setting in advance to execute wireless printing. That is, after connecting the information processing apparatus and the image output apparatus to the same network, and installing a driver corresponding to the connected image output apparatus, a user needs to register a print queue corresponding to the connected image output apparatus. The user needs to perform these operations manually, which takes much time.

Japanese Patent Laid-Open No. 2002-366502 discloses a method of searching, on an information processing apparatus, for an image output apparatus within the same segment, automatically downloading and installing a driver from a Web site or the like, and adding a print queue. Japanese Patent Laid-Open No. 2012-173816 discloses a method of reducing the user labor along with necessary preset when a user who already uses an image output apparatus on a LAN newly performs connection to the same image output apparatus via a print server to execute printing.

As a method of connecting an information processing apparatus and an image output apparatus via a wireless LAN, there are provided wireless infrastructure connection in which the information processing apparatus and the image output apparatus are connected to each other via a wireless LAN router or the like, and wireless direct connection in which the information processing apparatus and the image output apparatus are directly connected to each other without intervention of the wireless LAN router or the like. A print queue of the image output apparatus registered in the information processing apparatus may be configured to be registered in correspondence with the IP address of the registered image output apparatus. In this case, since the IP address is different between a case in which the information processing apparatus and the image output apparatus are connected to each other by wireless infrastructure connection and a case in which the information processing apparatus and the image output apparatus are connected to each other by wireless direct connection, a print queue corresponding to each connection method needs to be registered.

For example, assume a user who already connects the information processing apparatus and the image output apparatus by wireless infrastructure connection, registers a print queue for wireless infrastructure connection, and uses the image output apparatus. In this case, when the user carries the information processing apparatus and the image output apparatus to a place where there is no wireless LAN router, he/she needs to perform connection by wireless direct connection to execute printing from the information processing apparatus using the image output apparatus. To do this, the user needs to make a necessary setting again to perform connection by wireless direct connection. For example, as a necessary setting, connection between the information processing apparatus and the image output apparatus is switched from wireless infrastructure connection to wireless direct connection. Furthermore, if the user has not executed printing from the information processing apparatus using the image output apparatus by wireless direct connection, he/she also needs to additionally register a print queue.

As described above, although the same information processing apparatus and image output apparatus are used, it may be necessary to perform an additional operation such as switching of connection and registration of a new print queue along with switching of the communication method, thereby causing user confusion and labor.

SUMMARY OF THE INVENTION

An aspect of the present invention is to eliminate the above-mentioned problem with conventional technology.

A feature of the present invention is to provide a technique of improving convenience when an image output apparatus is used by a plurality of communication methods after a setup.

According to a first aspect of the present invention, there is provided an information processing method for an information processing apparatus that communicates with an image output apparatus, the information processing apparatus including a connection unit configured to operate in at least one of a first connection mode in which the information processing apparatus is wirelessly connected to the image output apparatus via an access point and a second connection mode in which the information processing apparatus is wirelessly connected to the image output apparatus without intervention of the access point, the method comprising executing setup processing that can execute registering a first print queue to be used at the time of printing via the connection unit operating in the first connection mode, and registering a second print queue to be used at the time of printing via the connection unit operating in the second connection mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A is a view showing a screen for setting the SSID, encryption method, and passphrase of a wireless LAN router according to the embodiment;

FIG. 4B is a view showing the screen for setting the SSID, encryption method, and passphrase of the wireless LAN router according to the embodiment;

FIG. 5 is a view showing a connection method selection screen of the image output apparatus according to the embodiment;

DESCRIPTION OF THE EMBODIMENTS

Figure 1A:
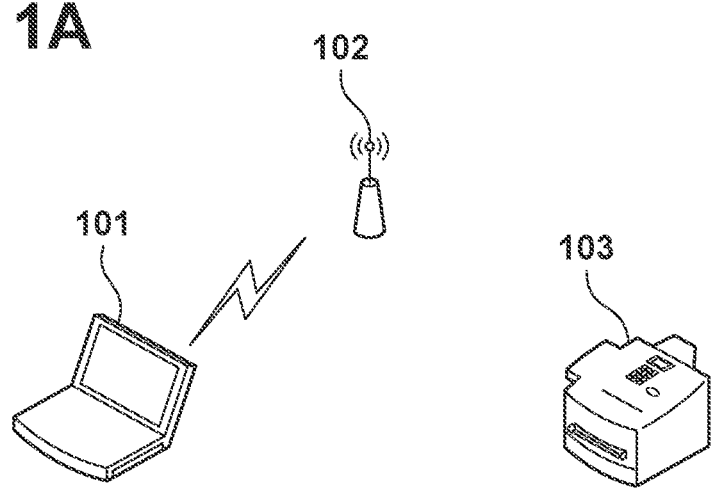
FIG. 1A is a view showing the connection status between an image output apparatus and an information processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

A connection form among an information processing apparatus, a wireless LAN router, and an image output apparatus will be described with reference to FIGS. 1A, 1B, and 1C. This embodiment assumes that the information processing apparatus is a personal computer or a smartphone, and the image output apparatus is a printer.

FIG. 1A is a view showing a status in which an information processing apparatus 101 and a wireless LAN router 102 are connected by a wireless LAN. The information processing apparatus 101 has a wireless LAN communication function, and communication of setup processing is performed wirelessly.

Figure 1B:
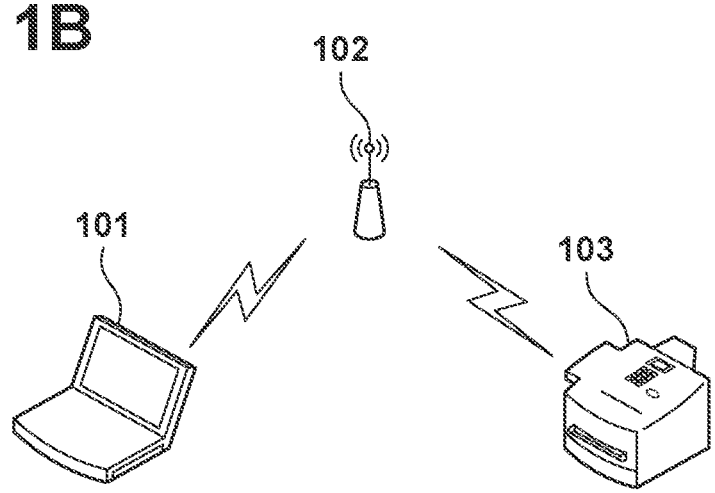
FIG. 1B is a view showing the connection status between the image output apparatus and the information processing apparatus according to the embodiment.
Figure 1C:
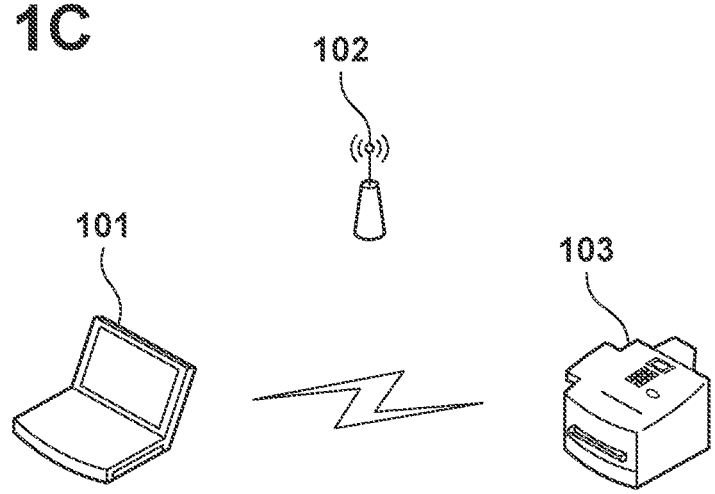
FIG. 1C is a view showing the connection status between the image output apparatus and the information processing apparatus according to the embodiment.

FIGS. 1B and 1C are views each showing a status after the setup processing is performed wirelessly for the information processing apparatus and the image output apparatus in the status shown in FIG. 1A. FIG. 1B shows a wireless infrastructure connection status in which an image output apparatus 103 is wirelessly connected to the wireless LAN router 102. The wireless LAN router 102 is also called an access point (AP). As shown in FIG. 1B, a communication mode in which the information processing apparatus is connected to another communication apparatus (for example, the image output apparatus 103) via the AP 102 will be referred to as a wireless infrastructure connection mode hereinafter.

FIG. 1C shows a wireless direct connection status in which the image output apparatus 103 is wirelessly connected to the information processing apparatus 101. As shown in FIG. 1C, a communication mode in which the information processing apparatus 101 is connected to another communication apparatus (for example, the image output apparatus 103) without intervention of the AP 102 will be referred to as a wireless direct connection mode hereinafter.

To which of the statuses shown in FIGS. 1B and 1C the status transitions as a result of the setup processing will be described hereinafter.

Figure 2:
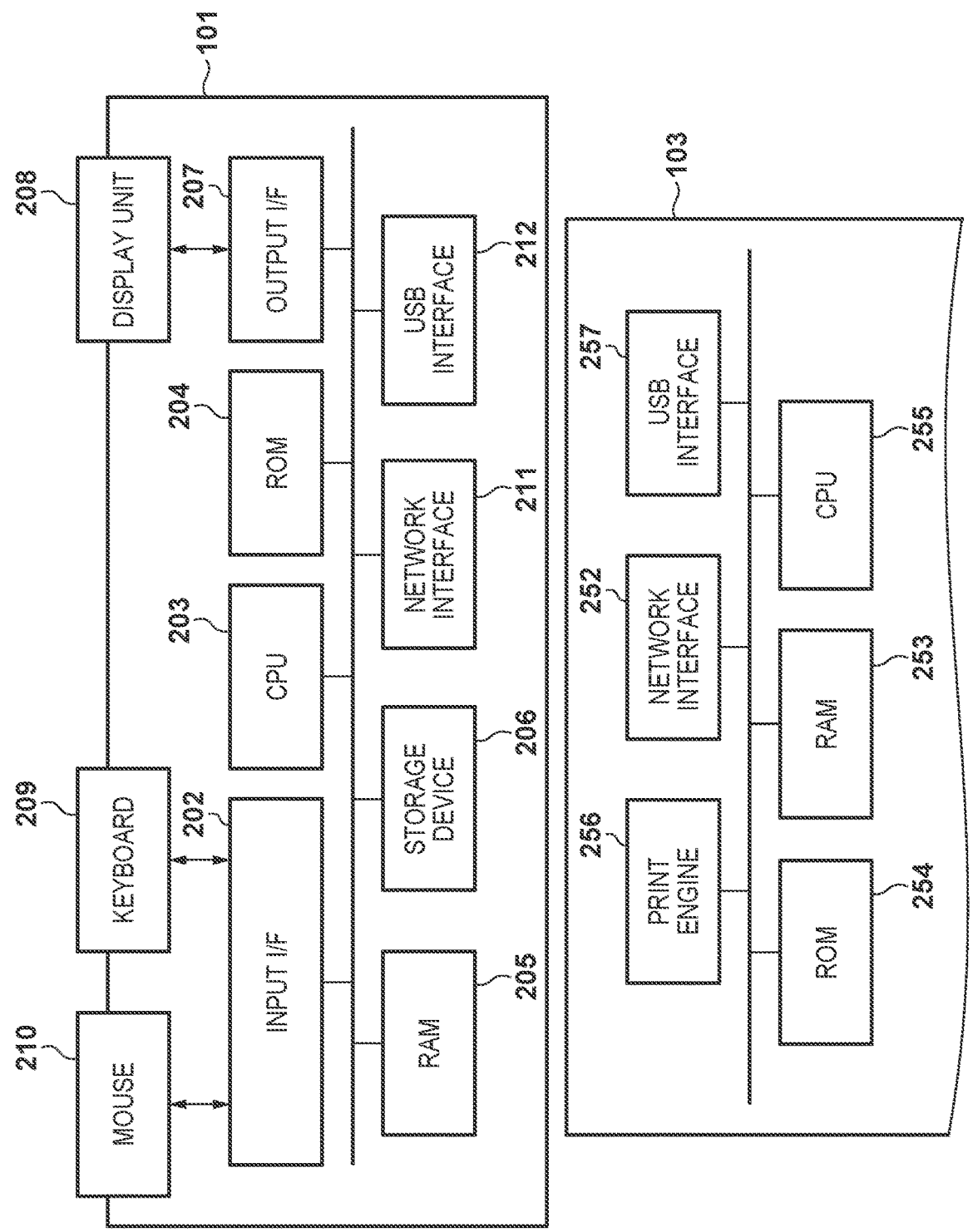
FIG. 2 is a block diagram showing examples of apparatus arrangements according to the embodiment.

The arrangements of the information processing apparatus 101 and the image output apparatus 103 will be described next with reference to FIG. 2.

The information processing apparatus 101 includes an input interface (I/F) 202, a CPU 203, a ROM 204, a RAM 205, an external storage device 206, an output I/F 207, a display unit 208, a keyboard 209, a mouse 210, a network I/F 211, and a USB I/F 212. The network I/F 211 controls wireless communication processing and communication processing via a wired LAN cable. The USB I/F 212 controls USB connection via a USB cable. The ROM 204 stores a program, and the external storage device 206 saves application programs, an Operating System (to be referred to as an OS hereinafter), a printer driver, and other various data. The RAM 205 is used as a work memory by various programs stored in the external storage device 206. A form in which Microsoft Windows® is used as the OS will be exemplified below.

The image output apparatus 103 includes a network I/F 252, a RAM 253, a print engine 256, a ROM 254, and a CPU 255. The network I/F 252 controls wireless communication and communication processing via a wired LAN cable. A USB I/F 257 controls USB connection via a USB cable. The RAM 253 is used as a main memory and a work memory of the CPU 255, is used as a reception buffer for temporarily saving received print job print data, and saves various data. The print engine 256 executes printing based on the data saved in the RAM 253. The ROM 254 stores various control programs and data to be used by each control program, and the CPU 255 controls the respective units of the image output apparatus 103 in accordance with these control programs.

As an example, processing sharing between the information processing apparatus 101 and the image output apparatus 103 is done, as described above. However, the present invention is not particularly limited to this, and may adopt another form.

First Embodiment

This embodiment will be described in detail below with reference to FIGS. 3 to 8. In this embodiment, as an example of setup processing, an example in which a setting is made to connect an information processing apparatus 101 to an image output apparatus 103 by a wireless LAN will be described. Note that in this embodiment, a communication method used by the information processing apparatus 101 and the image output apparatus 103 in the wireless LAN is a wireless communication method complying with the IEEE802.11 series and generally called Wi-Fi.

Figure 3A:
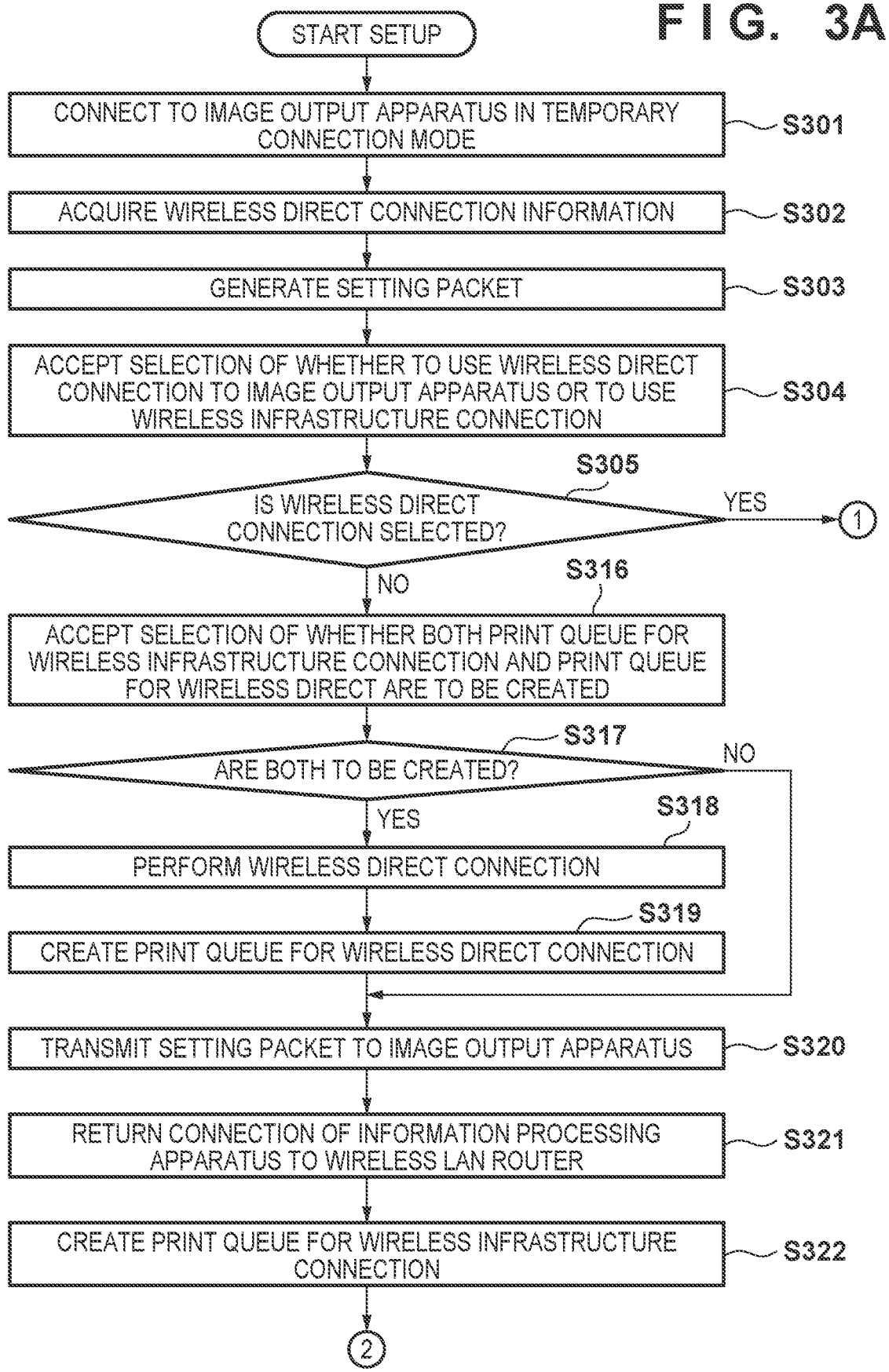
FIG. 3A is a flowchart illustrating an example of setup processing according to an embodiment.
Figure 3B:
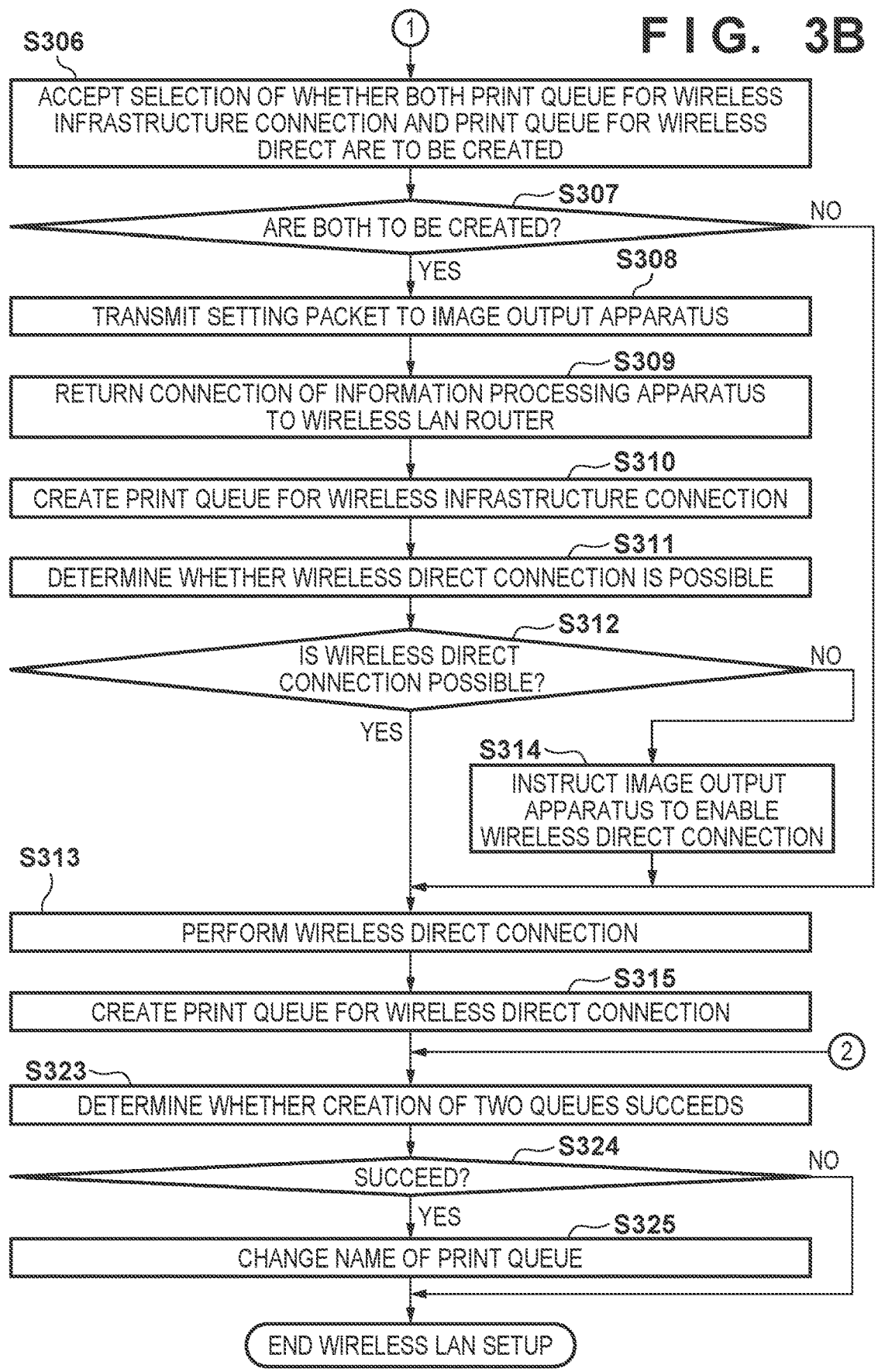
FIG. 3B is a flowchart illustrating an example of setup processing according to an embodiment.

FIGS. 3A and 3B are a flowchart when performing setup processing for setting a status in which the information processing apparatus 101 is connected to the image output apparatus 103 via a wireless LAN. This processing is generally saved as a setup program (to be referred to as this program hereinafter) in an external storage device 206, and processing executed when a CPU 203 controls the information processing apparatus 101 upon activation of this program will be described. Note that in the subsequent processing, the information processing apparatus 101 executes each process.

The information processing apparatus 101 executes setup processing that can execute registration of a print queue to be used at the time of printing using wireless direct connection and registration of a print queue to be used at the time of printing using wireless infrastructure connection. This eliminates the necessity of re-executing, after a setup, the setup such as addition of a print queue required due to a change of the communication method, thereby making it possible to improve user convenience after the setup. Note that the print queue indicates preparation of an area for storing print jobs in an input order on the operating system of the information processing apparatus 101. Thus, if a print job is input to the print queue, it is possible to transmit print data generated based on the print job to a corresponding IP address and port. Furthermore, in this embodiment, direct connection indicates connection between the information processing apparatus 101 and the image output apparatus 103 without intervention of an external access point such as a wireless LAN router. Infrastructure connection indicates connection between the information processing apparatus 101 and the image output apparatus 103 via an external access point. Note that direct connection is connection established when the image output apparatus 103 functions as an access point based on the normal Wi-Fi standard, as will be described below, but the present invention is not limited to this. Direct connection may be connection based on the Wi-Fi Direct standard. In connection based on the Wi-Fi Direct standard, group owner (GO) negotiation may be executed and one of the information processing apparatus 101 and the image output apparatus 103 may operate as a GO. Furthermore, when the image output apparatus 103 operates in an Autonomous GO mode, the image output apparatus 103 may always operate as a GO.

In step S301, the information processing apparatus 101 acquires, using the Application Program Interface (to be referred to as the API hereinafter) of the OS, information of a wireless LAN router 102 to which the information processing apparatus 101 is connected. Subsequently, the information processing apparatus 101 uses the API of the OS to perform wireless connection processing for the image output apparatus 103 in a temporary connection mode (to be described later), thereby establishing temporary connection. Connection information used for connection to the image output apparatus 103 includes, for example, an identifier of direct connection provided by the image output apparatus 103 and a passphrase for connection. For example, the connection information includes an SSID (Service Set Identifier) and a passphrase. This embodiment assumes that the connection information is used when the information processing apparatus 101 is returned to original wireless LAN connection to the wireless LAN router 102 after performing connection to the image output apparatus 103 in the temporary connection mode and performing setting processing. In this embodiment, the temporary connection mode is a mode in which the image output apparatus 103 is activated, based on predetermined setting information such as a predetermined SSID, in an access point mode for a predetermined period, and the information processing apparatus 101 can temporarily, wirelessly be connected to the image output apparatus 103 without requiring the passphrase. The access point mode is a mode in which the image output apparatus 103 functions as an access point and is connected to the information processing apparatus 101 by direct connection. Note that in this embodiment, the temporary connection mode is a mode in which Wi-Fi connection to the information processing apparatus 101 is established, as described above. The present invention, however, is not limited to this. The temporary connection mode may be a mode in which connection to the information processing apparatus 101 is established by a communication method other than Wi-Fi.

Then, communication (to be described later) between the information processing apparatus 101 and the image output apparatus 103 may be executed by the communication method other than Wi-Fi. The communication method other than Wi-Fi is, for example, Bluetooth or Near Field Communication (NFC). Bluetooth may be Classic Bluetooth or Bluetooth Low Energy.

After establishing temporary connection to the image output apparatus 103 in step S301, the information processing apparatus 101 acquires, in step S302, wireless direct connection information from the image output apparatus 103. In this embodiment, the wireless direct connection information includes an SSID and a passphrase necessary to perform wireless direct connection processing for the image output apparatus 103. In step S303, the information processing apparatus 101 generates a network connection setting packet for connecting the image output apparatus 103 to the wireless LAN router 102. In this embodiment, the setting packet is an example of a packet including the network identifier and passphrase of a network provided by the wireless LAN router 102. The connection information according to this embodiment includes an SSID, an encryption method, and a passphrase necessary for connection to the wireless LAN router 102.

Processing of designating an SSID, an encryption method, and a passphrase by the user will be described with reference to wireless LAN router setting screens shown in FIGS. 4A and 4B. The wireless LAN router setting screens shown in FIGS. 4A and 4B are screens for accepting, from the user, wireless LAN router information to be set in the image output apparatus.

In FIG. 4A, an SSID can be input to a text field 401, an encryption method is displayed in a list 402, and a user input is accepted. The encryption method includes at least one of Wi-Fi Protected Access (to be referred to as WPA hereinafter), WPA2, WPA3, Wired Equivalent Privacy (to be referred to as WEP hereinafter), and non-encryption. The user can make a selection from the list 402. If a setting button 403 is selected, the information processing apparatus 101 displays the screen shown in FIG. 4B.

The screen shown in FIG. 4B is a screen for accepting, from the user, the input of the passphrase of the wireless LAN router for which connection setting is performed. A text field 405 accepts the input of the passphrase of the wireless LAN router from the user. If the user selects a setting button 406, the information processing apparatus 101 performs processing of generating a network connection setting packet based on the network identifier (SSID) input to the text field 401, the encryption method selected in the list 402, and the passphrase input to the text field 405 (S303). Note that in this embodiment, a network connection setting packet is generated based on the SSID, encryption method, and passphrase accepted from the user. However, the CPU 203 may use the API of the OS to acquire, from the wireless LAN router 102, the SSID, encryption method, and passphrase of the wireless LAN router 102 to which the information processing apparatus 101 is connected, thereby generating a network connection setting packet.

Next, in step S304, the information processing apparatus 101 accepts, from the user, a selection of a wireless LAN connection method for connection between the information processing apparatus 101 and the image output apparatus 103. More specifically, the user is prompted to select the wireless infrastructure connection status shown in FIG. 1B or the wireless direct connection status shown in FIG. 1C as the connection status between the information processing apparatus 101 and the image output apparatus 103 after the setup processing.

FIG. 5 shows a screen displayed when two connection methods of wireless infrastructure connection and wireless direct connection are presented by radio buttons 501 and 502, respectively, and the user is prompted to arbitrarily make a selection. In this embodiment, when an OK button 503 is pressed in a status in which the radio button 501 is selected, the process advances to set wireless infrastructure connection as the connection status between the information processing apparatus 101 and the image output apparatus 103 after the end of the setup processing. On the other hand, if the OK button 503 is pressed in a status in which the radio button 502 is selected, the process advances to set the wireless direct connection status as the connection status between the information processing apparatus 101 and the image output apparatus 103 after the end of the setup processing. Note that the present invention is not limited to this as long as the user can arbitrarily select the connection status between the information processing apparatus 101 and the image output apparatus 103 after the end of the setup processing. As described above, by accepting the selection of the connection method after the setup processing, and deciding, based on the selection, the order of the print queues to be registered, it is possible to suppress the number of times of switching of the connection method before and after the setup processing, and shorten the time taken for the setup processing.

Next, processing when it is determined in step S305 that the user selects wireless direct connection as the connection status between the information processing apparatus 101 and the image output apparatus 103 after the end of the setup processing will be described below.

Figure 6A:
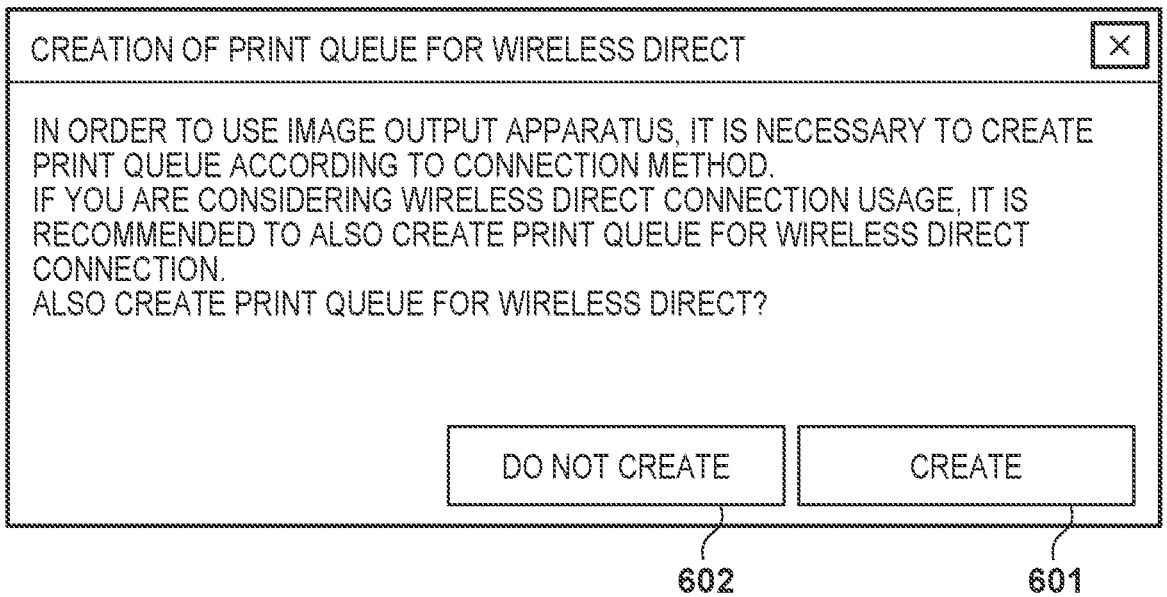
FIG. 6A is a view showing a screen for selecting whether two print queues are created according to the embodiment.

In step S306, the information processing apparatus 101 accepts a selection of whether two print queues are to be created by including a print queue for wireless infrastructure connection in addition to a print queue for wireless direct connection. FIG. 6A shows an example of a screen displayed when guidance on whether to create a print queue for wireless infrastructure connection is given and a user selection is accepted. In this embodiment, if a "not create" button 602 is selected, the process branches in step S307, and advances to processing in step S313. If a "create" button 601 is selected, the process branches in step S307, and advances to processing in step S308.

If the "create" button 601 is selected (YES in step S307), the information processing apparatus 101 advances the process to step S308, and transmits the network connection setting packet generated in step S303 to the image output apparatus 103. Next, in step S309, the information processing apparatus 101 uses the connection information (SSID/passphrase) of the wireless LAN router 102 held in step S301 to perform processing of reconnecting the information processing apparatus 101 to the wireless LAN router 102. Next, in step S310, the information processing apparatus 101 registers a print queue for executing printing by connecting the information processing apparatus 101 and the image output apparatus 103 by wireless infrastructure connection. More specifically, the information processing apparatus 101 searches for the image output apparatus 103 using a Simple Network Management Protocol (to be referred to as an SNMP hereinafter), and acquires IP address information from the image output apparatus 103 connected by wireless infrastructure connection via the wireless LAN router 102. Then, the information processing apparatus 101 uses the API of the OS to designate the acquired IP address information and a WSD (Web Services for Devices) port number as connection port information, thereby registering the print queue for wireless infrastructure connection. Note that in this embodiment, the SNMP is used as a method of acquiring IP address information. However, another protocol such as WSD may be used. Furthermore, the WSD port is used as connection port information but a Line PRinter daemon protocol (to be referred to as an LPR hereinafter) or Port 9100 port may be designated to register the print queue.

Next, in step S311, the information processing apparatus 101 uses the SNMP to determine whether the image output apparatus 103 functions in a status in which wireless direct connection is possible. Note that in this embodiment, the SNMP is used as a method of determining whether the image output apparatus 103 is in a status in which wireless direct connection is possible. However, the API of the OS may be used to search for the SSID included in the wireless direct connection information of the image output apparatus 103 acquired in step S302.

Next, in step S312, the information processing apparatus 101 branches the process in accordance with the result of the determination processing in step S311. If it is determined that the image output apparatus 103 can be connected by wireless infrastructure connection and wireless direct connection at the same time (to be referred to as a simultaneous operable device hereinafter), and is in a status in which wireless direct connection is possible (YES in step S312), the information processing apparatus 101 advances the process to step S313. In step S313, the wireless direct connection information of the image output apparatus 103 acquired in step S302 is used to connect the information processing apparatus 101 to the image output apparatus 103 by the API of the OS.

If it is determined that the image output apparatus 103 is not a simultaneous operable device and is not in the status in which wireless direct connection is possible (NO in step S312), the information processing apparatus 101 advances the process to step S314. In step S314, the information processing apparatus 101 generates a setting packet for instructing the image output apparatus 103 to transition to the status in which wireless direct connection is possible, transmits the setting packet to the image output apparatus 103, and advances the process to step S313.

Next, in step S315, the information processing apparatus 101 registers a print queue for executing printing by connecting the information processing apparatus 101 and the image output apparatus 103 by wireless direct connection. More specifically, the information processing apparatus 101 searches for the image output apparatus 103 using the SNMP, and acquires the IP address information from the image output apparatus 103 connected to the information processing apparatus 101 by wireless direct connection. Then, the information processing apparatus 101 uses the API of the OS to designate the acquired IP address information and a WSD port number as connection port information, thereby registering the print queue for wireless direct connection. Note that in this embodiment, the SNMP is used as a method of acquiring IP address information. However, another protocol such as WSD may be used. Furthermore, the WSD port is used as connection port information but an LPR or Port 9100 port may be designated to register the print queue.

Next, processing when it is determined in step S305 that the user selects wireless infrastructure connection as the connection status between the information processing apparatus 101 and the image output apparatus 103 after the end of the setting processing (NO in step S305) will be described below. In step S316, the information processing apparatus 101 accepts a selection of whether two print queues are to be created by including a print queue for wireless direct connection in addition to a print queue for wireless infrastructure connection.

Figure 6B:
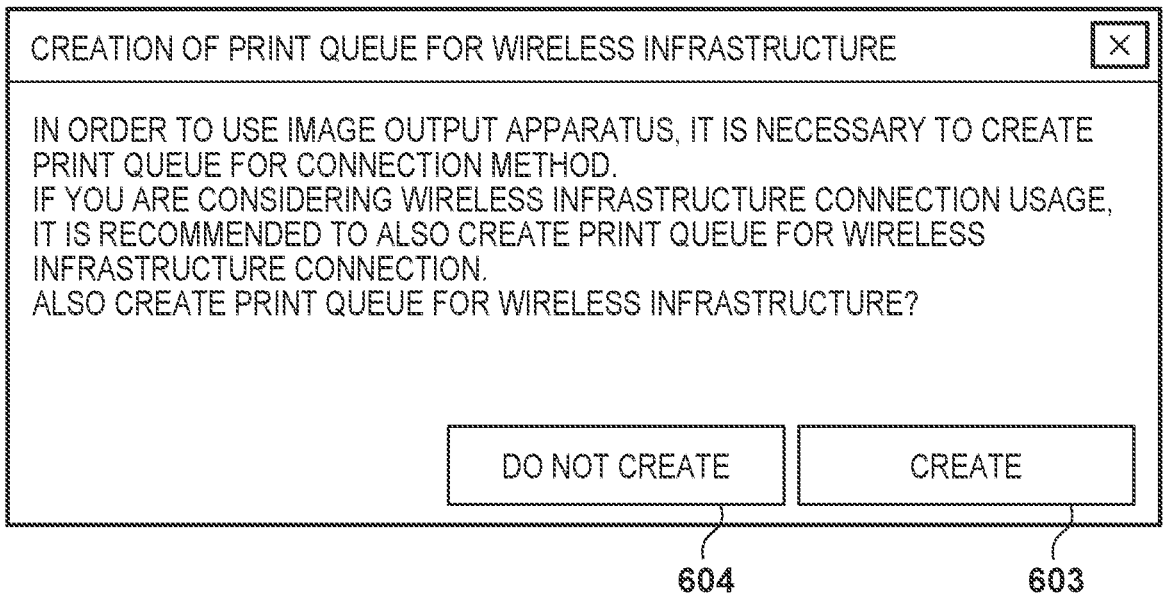
FIG. 6B is a view showing a screen for selecting whether two print queues are created according to the embodiment.

FIG. 6B shows an example of a screen displayed when guidance on whether to create a print queue for wireless direct connection is given and a user selection is accepted. In this embodiment, if a "not create" button 604 is selected, the process branches in step S317, and advances to processing in step S320. If a "create" button 603 is selected (YES in step S317), the process advances to processing in step S318. If the "not create" button 604 is selected (NO in step S317), the information processing apparatus 101 advances the process to step S320. Processing when the "create" button 603 is selected will be described below. In step S318, the information processing apparatus 101 performs wireless direct connection to the image output apparatus 103 using the wireless direct connection information of the image output apparatus 103 acquired in step S302. Next, in step S319, the information processing apparatus 101 registers the print queue for executing printing by connecting the information processing apparatus 101 and the image output apparatus 103 by wireless direct connection. More specifically, the information processing apparatus 101 searches for the image output apparatus 103 using the SNMP, and acquires the IP address information from the image output apparatus 103 connected to the information processing apparatus 101 by wireless direct connection. Then, the information processing apparatus 101 uses the API of the OS to designate the acquired IP address information and a WSD port number as connection port information, thereby registering the print queue for wireless direct connection. Note that in this embodiment, the SNMP is used as a method of acquiring IP address information. However, another protocol such as WSD may be used. Furthermore, the WSD port is used as connection port information but an LPR or Port 9100 port may be designated to register the print queue.

Next, in step S320, the information processing apparatus 101 transmits the network connection setting packet generated in step S303 to the image output apparatus 103. In step S321, the information processing apparatus 101 uses the information (SSID/passphrase) of the wireless LAN router 102 held in step S301 to perform processing of reconnecting the information processing apparatus 101 to the wireless LAN router 102. In step S322, the information processing apparatus 101 registers a print queue for executing printing by connecting the information processing apparatus 101 and the image output apparatus 103 by wireless infrastructure connection. More specifically, the information processing apparatus 101 searches for the image output apparatus 103 using the SNMP, and acquires the IP address information from the image output apparatus 103 connected by wireless infrastructure connection via the wireless LAN router 102. Then, the information processing apparatus 101 uses the API of the OS to designate the acquired IP address information and a WSD port number as connection port information, thereby registering the print queue for wireless infrastructure connection. Note that in this embodiment, the SNMP is used to acquire the IP address information. However, another protocol such as WSD may be used. Furthermore, the WSD port is used as connection port information but an LPR or Port 9100 port may be designated to register the print queue.

Next, in step S323, the information processing apparatus 101 uses the API of the OS to list the registered print queues, performs a search based on the print queue information, and executes processing of determining whether both the print queues have been successfully registered in steps S310 and S314. The print queue information includes, for example, the IP address information and the port number. Note that in this embodiment, by listing the registered print queues, and confirming whether a designated one of them has been registered, it is determined whether registration of the print queue to be used for wireless infrastructure connection and the print queue to be used for wireless direct connection has succeeded. In an example, a success/failure flag may be managed when each print queue is registered. If, as a result of the determination processing in step S323, it is determined that registration of both the print queue to be used for wireless infrastructure connection and the print queue to be used for wireless direct connection has succeeded (YES in step S324), the information processing apparatus 101 advances the process to step S325. In step S325, the information processing apparatus 101 performs name change processing of accepting a change of the names of the two registered print queues. If it is determined that registration of both the print queues has not succeeded (NO in step S324), the processing shown in FIGS. 3A and 3B ends.

Figure 7:
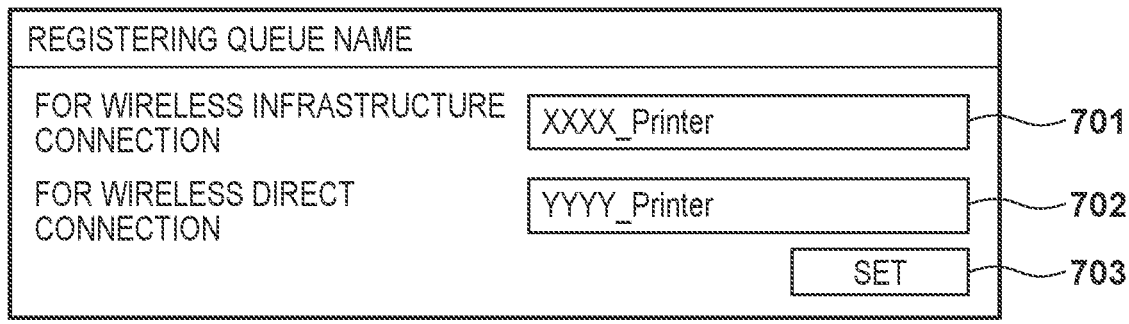
FIG. 7 is a view showing a print queue name setting screen according to the embodiment.

FIG. 7 shows an example of a screen for arbitrarily designating, by the user, on a user interface, the names of both the print queue to be used for wireless infrastructure connection and the print queue to be used for wireless direct connection. In this embodiment, the name of the print queue to be used for wireless infrastructure connection can be input to a text field 701 and the name of the print queue to be used for wireless direct connection can be input to a text field 702, thereby accepting a user input. Then, if a setting button 703 is selected, the information processing apparatus 101 renames the name of the print queue to be used for wireless infrastructure connection and the name of the print queue to be used for wireless direct connection to character strings designated in the text fields by the user. This embodiment assumes that a user input is accepted as examples of names with which the user can identify the two registered print queues. The present invention, however, is not limited to this. For example, the information processing apparatus 101 may automatically change the names to such names that the print queues can be identified.

Next, a simultaneous operable device according to this embodiment will be described. If the image output apparatus 103 is a simultaneous operable device, even if the image output apparatus 103 has already been connected by wireless infrastructure connection, the information processing apparatus 101 can find the SSID to be used for wireless direct connection to the image output apparatus 103. If the image output apparatus 103 is not a simultaneous operable device, a user operation of enabling the wireless direct setting of the image output apparatus 103 is required in order for the information processing apparatus 101 to find the SSID to be used for wireless direct connection to the image output apparatus 103. An example of the required user operation is an operation of enabling the wireless direct connection mode by a panel operation on the image output apparatus 103.

Wireless LAN profile information according to this embodiment will be described next. The OS according to this embodiment allows, when the information processing apparatus 101 is connected to another device by a wireless LAN, saving of wireless LAN profile information of the connected device. Therefore, if the information processing apparatus 101 makes a connection setting with another device once, the information processing apparatus 101 can automatically be connected when the SSID of the target device is found, unless the user actively deletes the saved wireless LAN profile information. That is, by making a setting for executing printing by a plurality of wireless communication methods at the time of setup processing, it becomes unnecessary to re-execute the setup processing even if the wireless communication method is switched. When, for example, the user carries the information processing apparatus 101 and the image output apparatus 103 to an environment where there is no AP, if the information processing apparatus 101 finds the SSID to be used for wireless direct connection to the image output apparatus 103, the information processing apparatus 101 is automatically connected by wireless direct connection. Then, if both the print queues for wireless infrastructure connection and wireless direct connection have already been created in the setup processing, it is unnecessary to additionally register a print queue. The user can execute printing only by selecting a target print queue from the identifiable print queues, thereby making it possible to reduce the labor for executing printing when the communication method is switched.

A default queue according to this embodiment will be described next. With respect to the print queues registered in the information processing apparatus 101, the last registered print queue is a print queue to be selected by the OS by default in the initial setting of the OS. Therefore, in step S304, the print queue used by the connection method arbitrarily selected by the user from the two connection methods of wireless infrastructure connection and wireless direct connection is selected by default after connection setting. Thus, when executing printing from the information processing apparatus 101 using the image output apparatus 103, the user need not change the print queue selected by default, thereby making it possible to further reduce the user labor.

Figure 8:
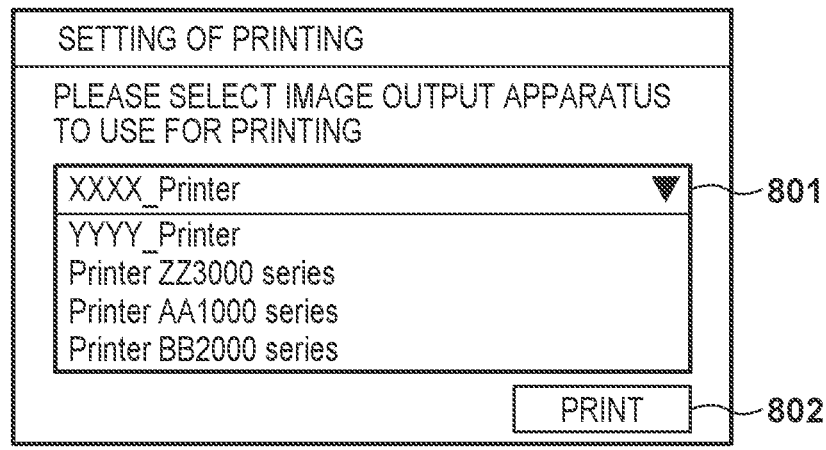
FIG. 8 is a view showing a print queue selection screen according to the embodiment.

FIG. 8 is a view showing an example in which if the user makes a setting in advance to execute printing according to this embodiment, the print queue is arbitrarily selected on the user interface when actually executing printing. The print queue selected by default in a combo box 801 is a print queue to be used by the connection method arbitrarily selected by the user in step S304. Furthermore, the name of the print queue is the identifiable name changed in step S325. To change the print queue, the user selects one of the print queues listed in the combo box 801. At this time, the listed print queues include the print queue whose name has been changed to the identifiable name in step S325, in addition to the print queue selected by default. When the user selects a print button 802 after selecting the print queue in the combo box 801, it is possible to output an image from the information processing apparatus 101 using the image output apparatus 103.

For example, in FIG. 8, the name of each queue may be displayed together with an icon corresponding to a communication method for each queue. For example, in the example shown in FIG. 7, a queue for wireless infrastructure connection is given a name of "XXXX_Printer", and a queue for wireless direct connection is given a name of "YYYY_Printer". In this case, the information processing apparatus 101 stores each queue and a communication method therefor in association with each other. Then, on the screen shown in FIG. 8, the first icon is displayed in association with "XXXX_Printer", and the second icon is displayed in association with "YYYY_Printer". This allows the user to intuitively grasp the communication method corresponding to each print queue when selecting the print queue. In an example, the first icon for wireless infrastructure connection may be an image representing a stationary printer, and the second icon for wireless direct connection may be an image representing a mobile printer.

With the above processing, when the user wirelessly connects the information processing apparatus 101 and the image output apparatus 103, and makes a setting to execute printing, the user can perform print processing from the image output apparatus 103 using the print queue selected by default. Then, if the user carries the information processing apparatus 101 and the image output apparatus 103 to an environment where there is no AP, the information processing apparatus 101 and the image output apparatus 103 are automatically connected by wireless direct connection. Furthermore, the print queue usable by wireless infrastructure connection and the print queue usable by wireless direct connection have already been created. Therefore, the user can output an image from the information processing apparatus 101 to the image output apparatus 103 only by selecting the print queue to be used for printing after the setup processing, thereby making it possible to reduce the user labor for preparation for printing. This can improve convenience when the image output apparatus is used by a plurality of communication methods.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-071331, filed on Apr. 20, 2021, which is hereby incorporated by reference herein in its entirety.

What is claimed is:

1. A control method for an information processing apparatus that communicates with an image output apparatus, the method comprising:
receiving a certain user operation; and executing as processing based on the certain user operation, both of:
  registering a first print queue to be used at the time of printing using a first wireless connection via an external access point between the information processing apparatus and the image output apparatus; and
  registering a second print queue to be used at the time of printing using a second wireless connection not via the external access point between the information processing apparatus and the image output apparatus.

2. The method according to claim 1, further comprising accepting, if it is determined that registration of the first print queue and the second print queue succeeds, a change of names of the first print queue and the second print queue.

3. The method according to claim 1, further comprising transmitting, to the image output apparatus, information to be used to connect to the external access point via communication between the image output apparatus and the information processing apparatus,
  wherein, after the information to be used to connect to the external access point has been transmitted to the image output apparatus and the first wireless connection has been established, the registration of the first print queue is executed based on the information received from the image output apparatus via the first wireless connection.

4. The method according to claim 1, further comprising receiving, from the image output apparatus, information to be used to connect to the image output apparatus not via the external access point via communication between the image output apparatus and the information processing apparatus,
  wherein, after the information to be used to connect to the external access point not via the external access point has been received from the image output apparatus and the second wireless connection has been established, the registration of the second print queue is executed based on the information received from the image output apparatus via the second wireless connection.

5. The method according to claim 1, wherein
  the certain user operation is a first input corresponding to a wireless connection between the information apparatus and the image output apparatus via the external access point, or a second input corresponding to a wireless connection between the information apparatus and the image output apparatus not via the external access point,
  in a case where the first input has been accepted, the registration of the first print queue is executed after execution of the registration of the second print queue, and
  in a case where the second input has been accepted, the registration of the second print queue is executed after execution of the registration of the first print queue.

6. The method according to claim 5, wherein
  in a case where the first input has been accepted, the establishment of the first wireless connection and the registration of the first print queue are executed after execution of the establishment of the second wireless connection and the registration of the second print queue, and
  in a case where the second input has been accepted, the establishment of the second wireless connection and the registration of the second print queue are executed after execution of the establishment of the first wireless connection and the registration of the first print queue.

7. The method according to claim 6, further comprising:
  transmitting, to the image output apparatus, information to be used to connect to the external access point via communication between the image output apparatus and the information processing apparatus, and
  receiving, from the image output apparatus, information to be used to connect to the image output apparatus not via the external access point via communication between the image output apparatus and the information processing apparatus,
  wherein the first wireless connection is established by transmitting information to the external access point to the image output apparatus, and
  the second wireless connection is established by receiving, from the image output apparatus, information to be used to connect to the image output apparatus not via the external access point.

8. The method according to claim 5, further comprising:
  in a case where the first input has been accepted, accepting a third input corresponding to executing both registration of the first print queue and registration of the second print queue, or a fourth input corresponding to execution of registration of the first print queue and corresponding to not executing registration of the second print queue; and
  in a case where the second input has been accepted, accepting the third input or a fifth input corresponding to executing registration of the second print queue and corresponding to not executing registration of the first print queue,
  wherein in a case where the third input has been accepted, registration of the first print queue and registration of the second print queue are executed,
  in a case where the fourth input has been accepted, registration of the first print queue is executed and registration of the second print queue is not executed,
  in a case where the fifth input has been accepted, registration of the first print queue is not executed and registration of the second print queue is executed.

9. The method according to claim 1, wherein registration of the first print queue is executed by obtaining IP address information from the image output apparatus via the first wireless connection, and
  registration of the second print queue is executed by obtaining the IP address information from the image output apparatus via the second wireless connection.

10. The method according to claim 9, wherein registration of the first print queue and registration of the second print queue are executed by designating port number and the IP address information using an Application Program Interface (API) of Operating System (OS).

11. The method according to claim 1, wherein in a case where registration of the first print queue and registration of the second print queue are executed, a user operation for selecting one of a plurality of print queues including the first print queue and the second print queue is accepted by the information processing apparatus, and
  printing is executed using the print queue selected from the plurality of print queues.

12. The method according to claim 1, further including:
  transmitting, to the image output apparatus, information to be used to connect to the external access point via communication between the image output apparatus and the information processing apparatus; and
  receiving, from the image output apparatus, information to be used to connect to the image output apparatus not via the external access point via communication between the image output apparatus and the information processing apparatus, wherein, after the information used to connect to the external access point has been transmitted to the image output apparatus and the first wireless connection has been established, the registration of the first print queue is executed based on the information received from the image output apparatus via the first wireless connection, and after the information used to connect to the image output apparatus not via the external access point has been received from the image output apparatus and the second wireless connection has been established, the registration of the second print queue is executed based on the information received from the image output apparatus via the second wireless connection, and the communication between the image output apparatus and the information processing apparatus is communicated via a third wireless connection which a connection between the image output apparatus and the information processing apparatus not via the external access point and which is different from the second wireless connection.

13. The method according to claim 12, wherein communication between the image output apparatus and the information processing apparatus is communicated according to one of Wi-Fi, Classic Bluetooth, Bluetooth Low Energy, and Near Field Communication.

14. An information processing apparatus for communicating with an image output apparatus, comprising:
one or more processors; and
one or more memories storing instructions that, when executed by the one or more processors of the information processing apparatus, cause the information processing apparatus to:
receive a certain user operation; and
execute as processing based on the certain user operation, both of:
registration of a first print queue to be used at the time of printing using a first wireless connection via an external access point between the information processing apparatus and the image output apparatus; and
registration of a second print queue to be used at the time of printing using a second wireless connection not via the external access point between the information processing apparatus and the image output apparatus.

15. A non-transitory computer-readable storage medium storing a program for causing an information processing apparatus, that communicates with an image output apparatus, the method comprising:
receiving a certain user operation; and
executing as processing based on the certain user operation, both of:
registering a first print queue to be used at the time of printing using a first wireless connection via an external access point between the information processing apparatus and the image output apparatus; and
registering a second print queue to be used at the time of printing using a second wireless connection not via the external access point between the information processing apparatus and the image output apparatus.

* * * * *